(12) United States Patent
Towata

(10) Patent No.: US 8,625,135 B2
(45) Date of Patent: Jan. 7, 2014

(54) INFORMATION PROCESSING APPARATUS CAPABLE OF COMMUNICATING WITH AN IMAGE FORMING APPARATUS HAVING A WEB BROWSER

(75) Inventor: Hiroaki Towata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 611 days.

(21) Appl. No.: 12/920,310

(22) PCT Filed: Jul. 14, 2010

(86) PCT No.: PCT/JP2010/062282
§ 371 (c)(1),
(2), (4) Date: Aug. 30, 2010

(87) PCT Pub. No.: WO2011/016339
PCT Pub. Date: Feb. 10, 2011

(65) Prior Publication Data
US 2011/0176163 A1    Jul. 21, 2011

(30) Foreign Application Priority Data
Aug. 5, 2009   (JP) ................................ 2009-182892

(51) Int. Cl.
*G06F 3/12*     (2006.01)
*G06F 15/16*    (2006.01)
*G06K 15/00*    (2006.01)

(52) U.S. Cl.
USPC ........... 358/1.15; 709/201; 709/202; 709/203

(58) Field of Classification Search
USPC ................................. 358/1.15; 709/201–203
See application file for complete search history.

(56) References Cited

U.S. PATENT DOCUMENTS

| | | | | |
|---|---|---|---|---|
| 2002/0027673 A1* | 3/2002 | Roosen et al. | ............... | 358/1.13 |
| 2003/0053118 A1* | 3/2003 | Muramoto et al. | .......... | 358/1.15 |
| 2006/0056873 A1* | 3/2006 | Kimura | ........................... | 399/81 |
| 2008/0186538 A1* | 8/2008 | Park | ........................... | 358/1.15 |

FOREIGN PATENT DOCUMENTS

| | | |
|---|---|---|
| JP | 2000-118085 A | 4/2000 |
| JP | 2001-290692 A | 10/2001 |
| JP | 2004-214692 A | 7/2004 |
| JP | 2004-358800 A | 12/2004 |
| JP | 2005-182253 A | 7/2005 |
| JP | 2006-205442 A | 8/2006 |

OTHER PUBLICATIONS

PCT International Search Report and Written Opinion of the International Searching Authority, mailed Oct. 19, 2010 in PCT /JP2010/062282.

* cited by examiner

*Primary Examiner* — Fred Guillermety
(74) *Attorney, Agent, or Firm* — Fitzpatrick, Cella, Harper & Scinto

(57) ABSTRACT

An information processing apparatus is provided that appropriately selects a push-type printing method or a pull-type printing method according to an image forming apparatus that requested data to be printed, thus effectively allowing the image forming apparatus to have the advantages of the respective printing methods. To accomplish this, in the information processing apparatus, when a request from a web browser of the image forming apparatus has been received, the information processing apparatus selects whether to transmit image data to the image forming apparatus by a first method in which image data is transmitted to the web browser as a response to the request from the web browser, or by a second method in which image data is transmitted as a new request without employing the web browser, and the information processing apparatus transmits the image data to the image forming apparatus according to the selected method.

13 Claims, 17 Drawing Sheets

907

| IMAGE FORMING APPARATUS IP ADDRESS | PRINTING METHOD |
|---|---|
| 122.44.7.56 | Push |
| 122.44.7.57 | Push |
| 202.24.3.18 | Pull |

F I G. 7
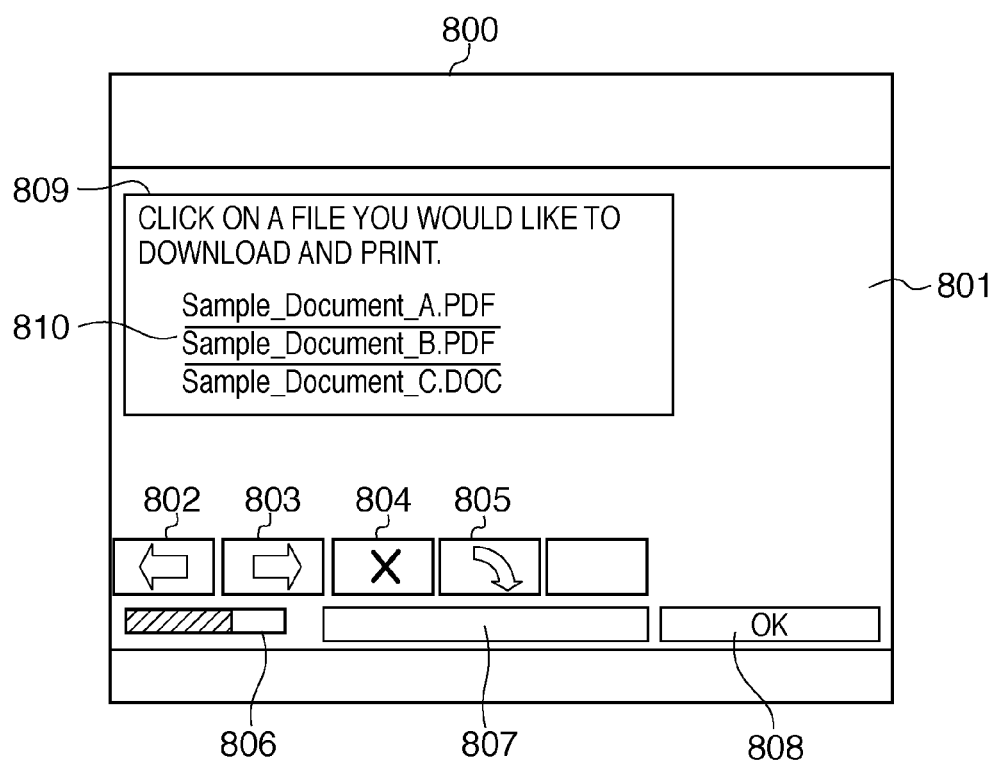

F I G. 10

```
CLICK ON A FILE YOU WOULD LIKE TO DOWNLOAD AND PRINT.<BR><BR>
<A href="http://WebSite1/Default.aspx/Sample_Document_A.PDF>Sample_Document_A.PDF"</A><BR>
<A href="http://WebSite1/Default.aspx/Sample_Document_B.PDF>Sample_Document_B.PDF"</A><BR>
Sample_Document_C.DOC<BR>
```

FIG. 11

SELECT THE FILES YOU WOULD LIKE TO PRINT.

```
<TABLE>
<TBODY>
<TR>
  <TD class=style2><INPUT id=CheckBox1 type=checkbox name=CheckBox1></TD>
  <TD class=style3><SPAN lang=ja>Sample_Document_A.PDF</SPAN></TD></TR>
<TR>
  <TD class=style1><INPUT id=CheckBox2 type=checkbox name=CheckBox2></TD>
  <TD><SPAN lang=ja>Sample_Document_B.PDF</SPAN></TD></TR>
<TR>
  <TD class=style1><INPUT id=CheckBox3 type=checkbox name=CheckBox3></TD>
  <TD>Sample_Document_C.PDF</TD>
</TR>
</TBODY>
</TABLE>
<BR>

<INPUT id=Button1 type=submit value=PRINT name=Button1>
```

FIG. 13

| IMAGE FORMING APPARATUS IP ADDRESS | PRINTING METHOD |
|---|---|
| 122.44.7.56 | Push |
| 122.44.7.57 | Push |
| 202.24.3.18 | Pull |

907

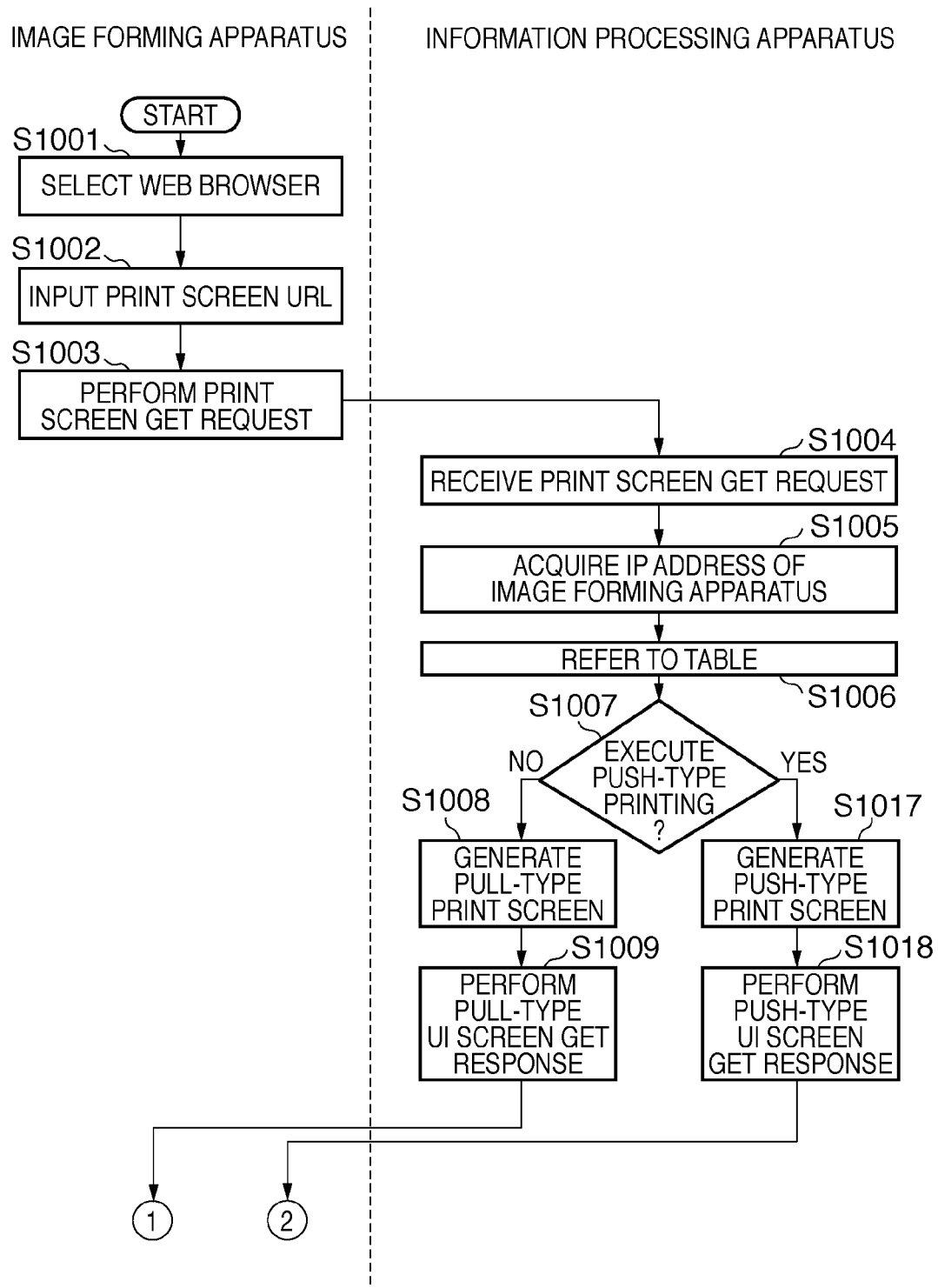
F I G. 14A

F I G. 14B
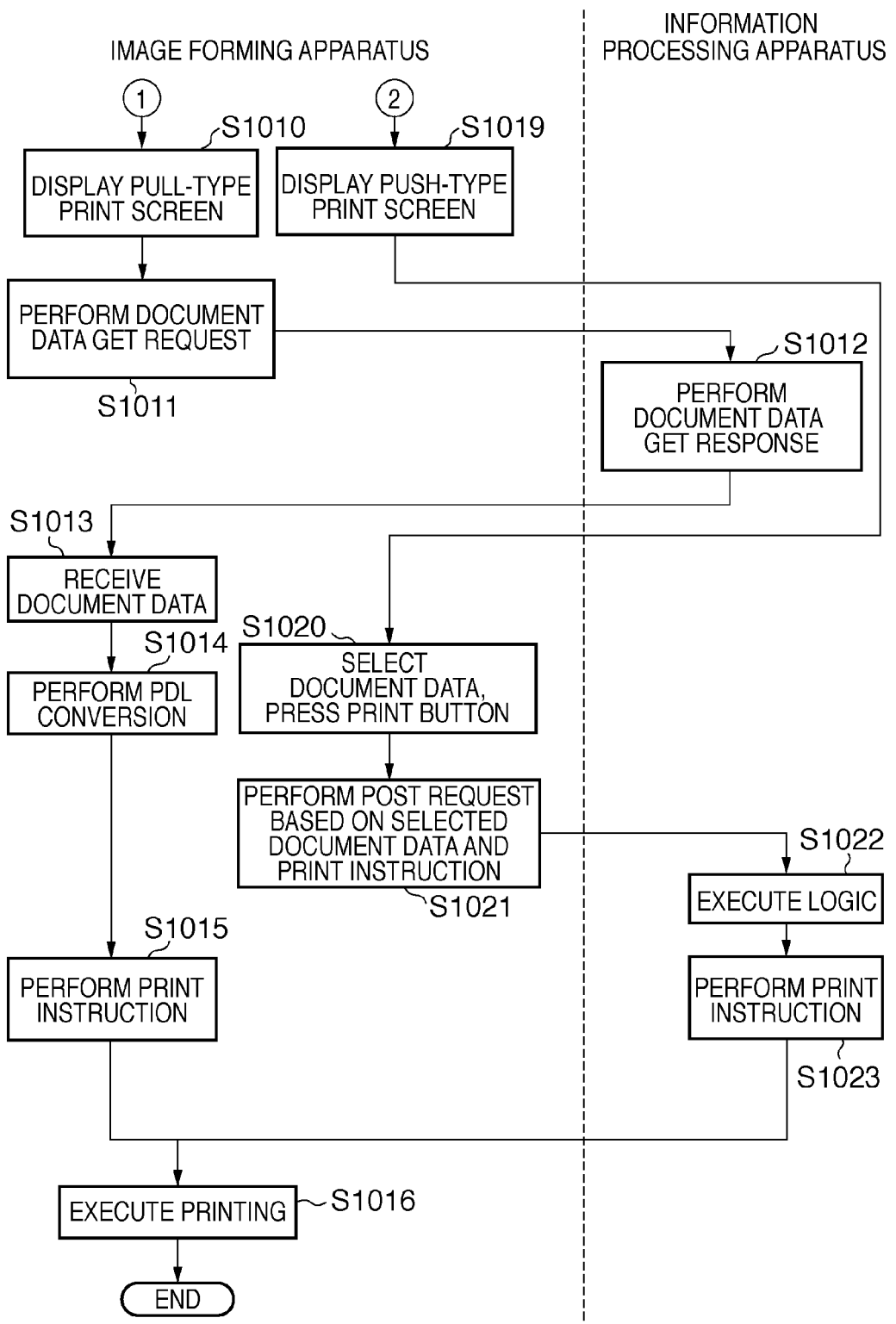

INFORMATION PROCESSING APPARATUS CAPABLE OF COMMUNICATING WITH AN IMAGE FORMING APPARATUS HAVING A WEB BROWSER

TECHNICAL FIELD

The present invention relates to an information processing apparatus that causes image forming to be executed in cooperation with an image forming apparatus, and a method and program for controlling the information processing apparatus.

BACKGROUND ART

Recently, among image forming apparatus there is known an image forming apparatus that has the functions of a printer, a copier, a facsimile apparatus, a scanner, and so forth. In such a multifunction image forming apparatus, a display unit, a print unit, an imaging unit, and so forth are provided within a single case, and also, three types of applications are provided that respectively correspond to a printer, a copier, and a facsimile apparatus. Also, technology is known where a web browser is provided as a web client function in the image forming apparatus, and used for apparatus functions by acquiring (downloading) various content from a remote web server and performing browsing. Thus, it is possible to download document data to be printed that is accumulated on a web server that is an information processing apparatus or the like, and execute PDL conversion of the document data or processing of imposition information in the information processing apparatus.

At present, as one sequence of processing that prints document data of a remote information processing apparatus, broadly speaking two printing methods have been proposed. For example, in Japanese Patent Laid-Open No. 2004-214692, a printing method has been proposed in which document data is downloaded using a browser of an image forming apparatus, and print processing logic such as PDL conversion and rasterization are executed on the downloaded document data. Below, the printing method described in Japanese Patent Laid-Open No 2004-214692 is referred to as pull-type printing. Also, in Japanese Patent Laid-Open No. 2000-118085, a printing method has been proposed in which, for a print operation of document data that has been performed with a browser of an image forming apparatus, PDL conversion is performed by a remote information processing apparatus, and the image forming apparatus is instructed to perform printing as a remote request. Here, among remote requests there are, for example, an IPP (Internet Printing Protocol), an LPR (Line Printer Daemon Protocol), web services, and so forth. Below, the printing method described in Japanese Patent Laid-Open No. 2000-118085 is referred to as push-type printing.

However, there are the following problems in the conventional technology. For example, with pull-type printing, there is the problem that because PDL conversion is performed in the image forming apparatus, this method of printing is only compatible with limited document data that can be processed with the image forming apparatus. With push-type printing on the other hand, in some instances communication is not possible in an environment in which there is a firewall or a proxy.

Here, for example, a configuration is assumed in which in a head office, an information processing apparatus and an image forming apparatus are connected by a local network, and a branch office has only an image forming apparatus that is connected to the head office via the internet. In this case, in the head office, the information processing apparatus and the image forming apparatus are located on the same local network, so push-type printing is possible, but in the branch office, it is necessary to connect to the information processing apparatus of the head office via the internet, so push-type printing cannot be executed. Accordingly, in this sort of configuration, pull-type printing that can be executed in all of the image forming apparatus is applied. However, because pull-type printing is also applied to an image forming apparatus that is on the local network and therefore capable of push-type printing, it is not possible for the image forming apparatus to have advantages of push-type printing such as a high degree of print logic customization. On the other hand, when push-type printing is performed for all of the image forming apparatus, there is the problem that printing cannot be executed in an image forming apparatus connected via the Internet.

SUMMARY OF INVENTION

The present invention enables realization of an information processing apparatus that appropriately selects a push-type printing method or a pull-type printing method according to an image forming apparatus that requested data to be printed, thus effectively allowing the image forming apparatus to have the advantages of the respective printing methods, and a method and program for controlling the information processing apparatus.

One aspect of the present invention provides an information processing apparatus that is capable of communicating with an image forming apparatus having a web browser, the information processing apparatus comprising: reception means for receiving a request from the web browser of the image forming apparatus; selection means for, when the reception means has received the request from the web browser, selecting to transmit image data to the image forming apparatus using a first method in which the image data is transmitted to the web browser as a response to the request from the web browser, or to transmit the image data to the image forming apparatus using a second method in which the image data is transmitted as a new request without employing the web browser; and transmission means for transmitting the image data to the image forming apparatus according to the method selected by the selection means.

Another aspect of the present invention provides a method for controlling an information processing apparatus that is capable of communicating with an image forming apparatus having a web browser, the method comprising: receiving a request from the web browser of the image forming apparatus; when the request has been received from the web browser, selecting to transmit image data to the image forming apparatus using a first method in which the image data is transmitted to the web browser as a response to the request from the web browser, or to transmit the image data to the image forming apparatus using a second method in which the image data is transmitted as a new request without employing the web browser; and transmitting the image data to the image forming apparatus according to the method that was selected.

Still another aspect of the present invention provides a computer-readable storage medium storing a computer program that causes a computer to execute the method for controlling the information processing apparatus.

Further features of the present invention will be apparent from the following description of exemplary embodiments with reference to the attached drawings.

BRIEF DESCRIPTION OF DRAWINGS

FIG. 7 shows an example of a print screen displayed when pull-type printing is selected according to the present invention.

FIG. 10 shows HTML code for generating the print screen for pull-type printing according to the present invention.

FIG. 11 shows HTML code for generating the print screen for push-type printing according to the present invention.

FIG. 13 shows an example of a table 907 that has been stored in a table management area 906 according to the present invention.

FIGS. 14A and 14B are flowcharts that show a processing procedure of print processing according to a first embodiment.

DESCRIPTION OF EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Information Processing System

Figure 1:
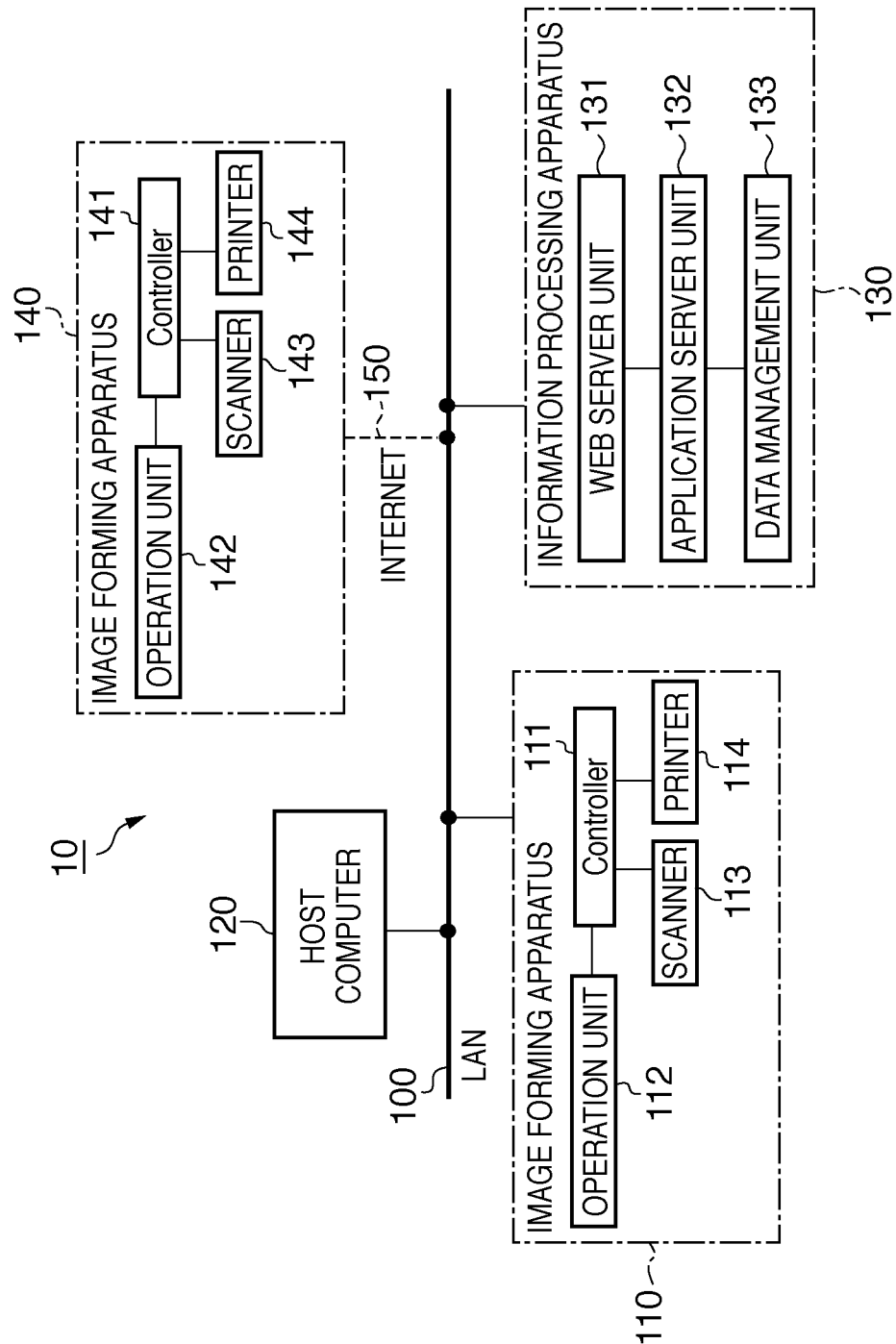
FIG. 1 is a block diagram that shows an example of an information processing system 10 according to the present invention.

Following is a description of configurations and technology common to various embodiments according to the present invention, with reference to FIGS. 1 to 13. FIG. 1 is a block diagram that shows an example of an information processing system 10 according to the present invention. In the information processing system 10, image forming apparatus 110 and 140, a host computer 120, and an information processing apparatus 130 are intercommunicably connected via a LAN (Local Area Network) 100. The information processing system 10 can also be connected via the LAN 100 to a WAN (Wide Area Network) or the Internet.

The host computer 120 includes a web browser, and can establish an HTTP connection with the image forming apparatus 110 or the information processing apparatus 130 to receive a provided service. For example, a PC (personal computer), a PDA (Personal Digital Assistant), a portable telephone, or the like can be applied as the host computer 120.

The information processing apparatus 130 has a software process group for realizing a web application server. A web server unit 131, an application server unit 132, and a data management unit 133 are provided as software modules in the information processing apparatus 130. The web server unit 131 transmits content such as HTML in response to a request according to the HTTP protocol from a client. The application server unit 132 is implemented in the form of a CGI (Common Gateway Interface) program or a Servlet that performs predetermined processing and a dynamically changing HTTP response in response to an HTTP request. The data management unit 133 saves script data called from the application server unit 132, stores received data, causes various data to be persistent, and so forth.

The image forming apparatus 110 is an example of an MFP (Multi-Function Peripheral) that performs input/output and transmission/receipt of images, and various image processing. The image forming apparatus 110 includes a scanner 113 that is an image input device, a printer 114 that is an image output device, a controller 111, and an operation unit 112 that is a user interface. The scanner 113, the printer 114, and the operation unit 112 are respectively connected to the controller 111, and are controlled according to commands from the controller 111. The controller 111 is connected to the LAN 100. Also, the image forming apparatus 140 is capable of HTTP communications with the other apparatus 110, 120, and 130 via an internet 150, and similar to the image forming apparatus 110, includes a scanner 143, a printer 144, an operation unit 142, and a controller 141.

Conventionally, an embedded application is implemented in an image forming apparatus, and by executing that embedded application, a print logic of the image forming apparatus such as PDL conversion is called and executed. However, with the conventional method in which the print logic is implemented by an embedded application, the print logic cannot easily be customized. Consequently, in an embodiment of the present invention, a push-type printing method is adopted in which for a print operation of document data (below, also referred to as image data) that has been performed by a web browser of the image forming apparatus 110, PDL conversion is performed in the remote information processing apparatus 130, and the image forming apparatus 110 is instructed to print as a remote request (for example, such as a request by IPP, web service, or LPR). With the push-printing method, it is possible for the embedded application that was implemented in the conventional image forming apparatus to be implemented as a web application of the information processing apparatus 130. Thus, the ability to customize the print logic can be improved. However, with the push-type printing method, in some instances communication is not possible in an environment in which there is a firewall or a proxy. Consequently, in an embodiment of the present invention, a printing method is adopted in which PDL conversion is executed in the image forming apparatus, and a pull-type printing method is also adopted in which communication is possible even in an environment in which there is a firewall or a proxy. That is, in an embodiment of the present invention, an optimal printing method is selected and executed for each image forming apparatus.

In the printing method as described above, the user uses the web browser of the image forming apparatus 110 to log into the application server unit 132 of the information processing apparatus 130. Next, the user performs a print execution request to the application server unit 132 of the information processing apparatus 130 via a user interface displayed in the web browser. Then, the application server unit 132 performs a print request to a web service provider module 203 of the image forming apparatus 110, described below. The web service provider module 203 of the image forming apparatus 110 executes printing according to the requested print instruction, via a print manager module 212 described later.

Software Configuration of Image Forming Apparatus

Figure 2:
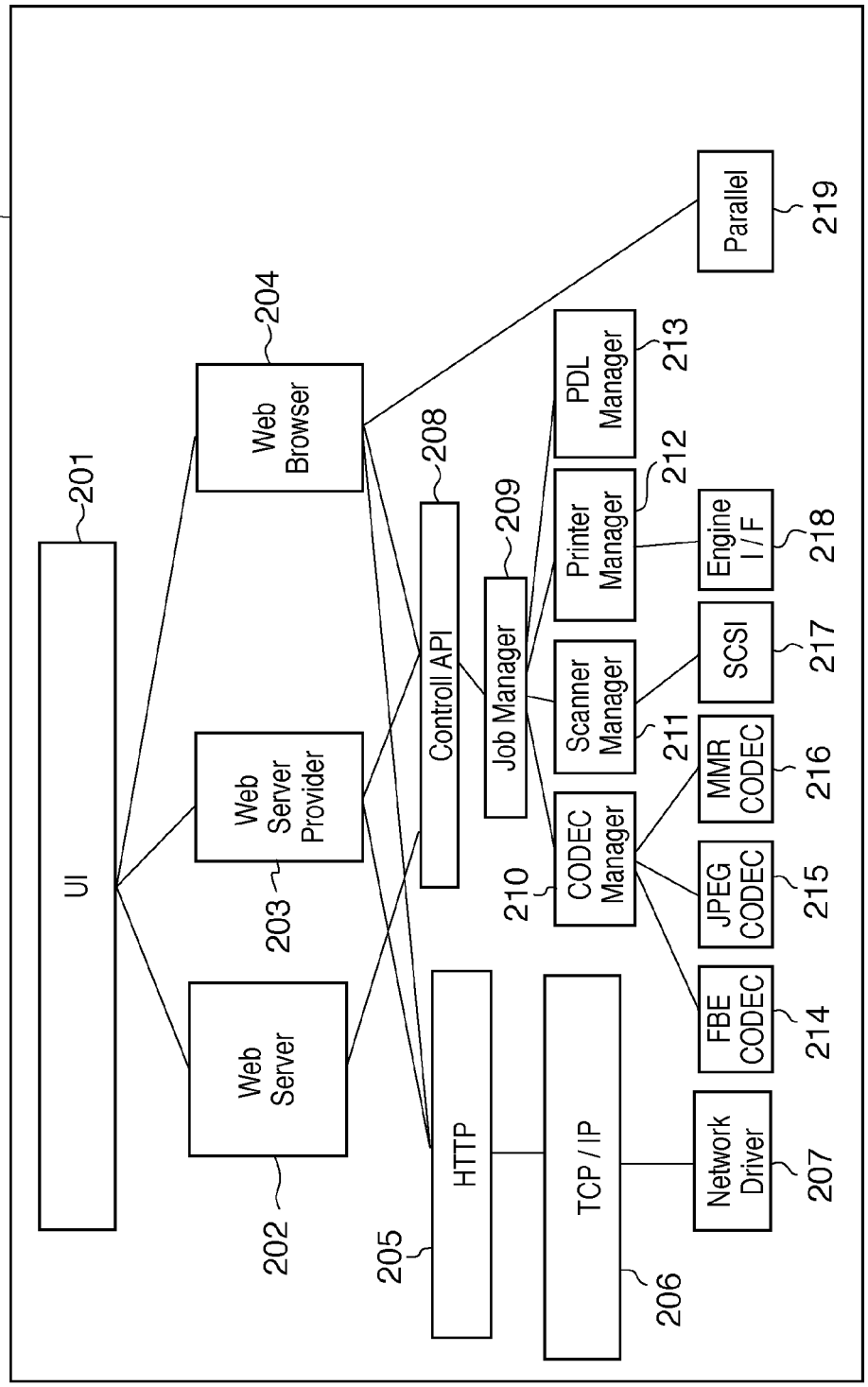
FIG. 2 is a block diagram that shows a software configuration of an image forming apparatus 110 according to the present invention.

Next is a description of a software configuration of the image forming apparatus 110, with reference to FIG. 2. FIG. 2 is a block diagram that shows the software configuration of the image forming apparatus 110 according to the present invention. A user interface (below, referred to as a UI) module 201 is a module that performs intermediation between devices and user operation when a user performs various operations/settings of the image forming apparatus 110. The UI module 201 performs transfer of input information to various modules described later, processing requests, data settings, and so forth according to operation by an operator.

A web server module 202 performs an HTTP response of management information or the like of the image forming apparatus 110 to a web client (for example, the host computer 120), in response to an HTTP request from the web client. Specifically, the web server module 202 performs an HTTP response to the web client via an HTTP module 205, a TCP/IP communications module 206, and a network driver 207. The web browser module 204 reads and displays information of various web sites (homepages) on an internet or an intranet. The web browser module 204 establishes a connection with other network nodes and performs communications via the HTTP module 205. In these communications, an HTTP request is issued for a resource described by a URL, and a response to that request is obtained. In the course of this request and response, encoding/decoding of communications data according to various encoding formats is also performed.

The HTTP module 205 is used when the image forming apparatus 110 performs HTTP communications. The HTTP module 205 uses the TCP/IP communications module 206 to provide a communications function for the web server module 202, the web browser module 204, and the web service provider module 203. Also, the HTTP module 205 is compatible with various protocols used on the web, such as HTTP, and in particular provides a communications function by a protocol compatible with security. The TCP/IP communications module 206 uses a network driver 207 to provide a network communications function for the various modules. The network driver 207 controls parts that are physically connected to the network.

A control API 208 provides, to upstream modules such as the web server module 202, an interface to downstream modules such as a job manager module 209. Thus, upstream modules and downstream modules are less dependent on each other, and so they may respectively be used more flexibly. The job manager module 209 interprets various processing instructed via the control API 208 from the various modules, and gives instructions to modules 210, 211, 212, and 213. Also, the job manager module 209 performs central management of hardware processing executed within the image forming apparatus 110.

A codec manager module 210 manages/controls various compression/decompression of data during processing instructed by the job manager module 209. An FBE encoder module 214 uses an FEE format to compress data that has been read by the job manager module 209 or a scanner manager module 211. A JPEG codec module 215 performs JPEG compression/decompression processing of data that has been read by the job manager module 209, the scanner manager module 211, or the print manager module 212. An MMR codec module 216 performs MMR compression/decompression processing of data that has been read by the job manager module 209, the scanner manager module 211, or the print manager module 212.

The scanner manager module 211 manages/controls scan processing instructed by the job manager module 209. Communications between the scanner manager module 211 and the scanner 113, which is internally connected to the image forming apparatus 110, are performed via a SCSI driver 217.

The print manager module 212 manages/controls print processing instructed by the job manager module 209. An interface between the print manager module 212 and the printer 114 is provided by an engine interface module 218. A PDL manager module 213 performs PDL conversion of document data instructed by the job manager module 209. Also, a parallel port driver 219 provides an interface when outputting data to an output device via a parallel port.

Detailed Configuration of Controller

Figure 3:
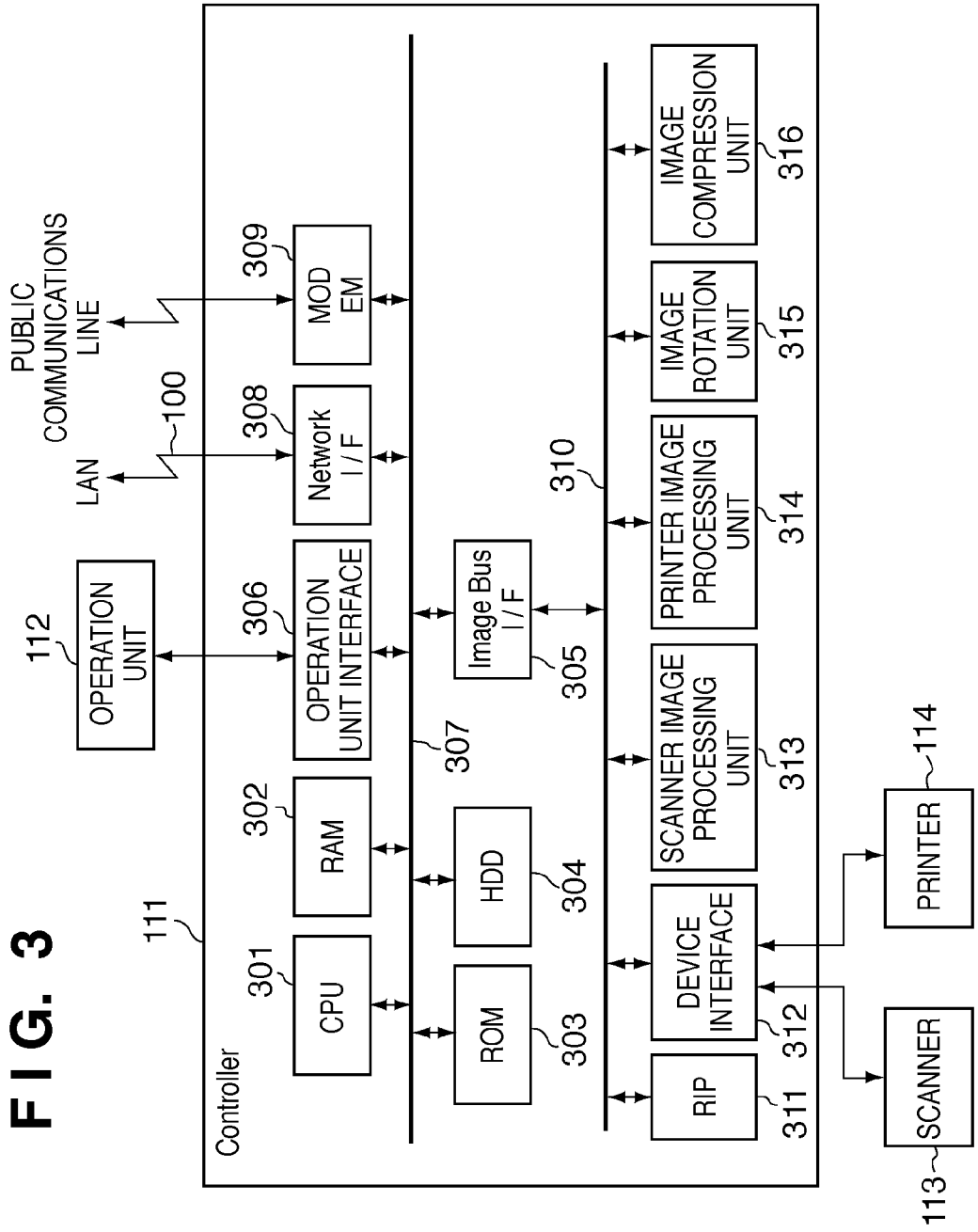
FIG. 3 is a block diagram that shows an example configuration of a controller 111 of the image forming apparatus 110 according to the present invention.

Next is a description of the detailed configuration of the controller 111 in the image forming apparatus 110, with reference to FIG. 3. FIG. 3 is a block diagram that shows an example configuration of the controller 111 of the image forming apparatus 110 according to the present invention. The controller 111 is connected to the scanner 113 that is an image input device and the printer 114 that is an image output device, and in addition to controlling the scanner 113 and the printer 114, is connected to the LAN or a public communications line, and performs input/output of image information and device information via the LAN or the public communications line. Therefore, the controller 111 is provided with a CPU 301, a RAM 302, an operation unit interface 306, a network interface 308, a modem 309, a ROM 303, an HDD (hard disk apparatus) 304, an image bus interface 305, a RIP (raster image processor) 311, a device interface 312, a scanner image processing unit 313, a printer image processing unit 314, an image rotation unit 315, and an image compression unit 316.

The CPU 301 is connected to the RAM 302, the ROM 303, the HDD 304, the image bus interface 305, the operation unit interface 306, the network interface 308, and the modem 309, via a system bus 307. The RAM 302 is a memory for providing a work area for the CPU 301, and is also used as an image memory for temporarily storing image data. The ROM 303 is a boot ROM, and stores a system boot program. System software, image data, and so forth are stored on the HDD 304.

The operation unit interface 306 is an interface for performing input/output between the controller 111 and the operation unit 112. The operation unit interface 306 outputs image data to be displayed in the operation unit 112 to the operation unit 112, and transmits information that a user has input via the operation unit 112 to the CPU 301. The network interface 308 is connected to the LAN 100, and performs input/output of information from/to the LAN 100. The modem 309 is connected to a public communication line, and performs input/output of information from/to the public communications line. The image bus interface 305 is a bus bridge that is connected to the system bus 307 and an image bus 310 that performs high-speed transfer of image data, and performs data structure conversion.

The RIP 311, the device interface 312, the scanner image processing unit 313, the printer image processing unit 314, the image rotation unit 315, and the image compression unit 316 are connected to the image bus 310. The RIP 311 converts PDL code received via the LAN 100 or the Internet into a bitmap image. The device interface 312 connects the controller 111 to the scanner 113 and the printer 114, and performs synchronous system/asynchronous system conversion of image data. The scanner image processing unit 313 performs correction, processing, editing, and so forth of input image data. The printer image processing unit 314 performs printer correction, resolution conversion, and so forth of print output image data. The image rotation unit 315 performs rotation of image data. The image compression unit 316 performs JPEG compression/decompression processing of multilevel image data, and performs compression/decompression processing such as JBIG, MMR, or MH processing of bi-level image data.

In addition to the configuration shown in FIG. 3, the controller 111 also includes an event processing unit and a script interpreter. The event processing unit receives events of operation by the user of a touch panel sheet, keys, and so forth on the operation unit 112, and performs processing corresponding to the respective events. Also, the event processing unit receives status change events of apparatus, jobs, or the like from the control API 208, and performs processing corresponding to the respective events. The script interpreter is an interpreter that interprets and executes scripts written in Java (registered trademark) Script (an ECMA Script) or the like. Such scripts are embedded in a document, or written in a separate file linked from a document. A content provider can use a script to program dynamic behavior of a provided document.

Configuration of Operation Unit 112

Figure 4:
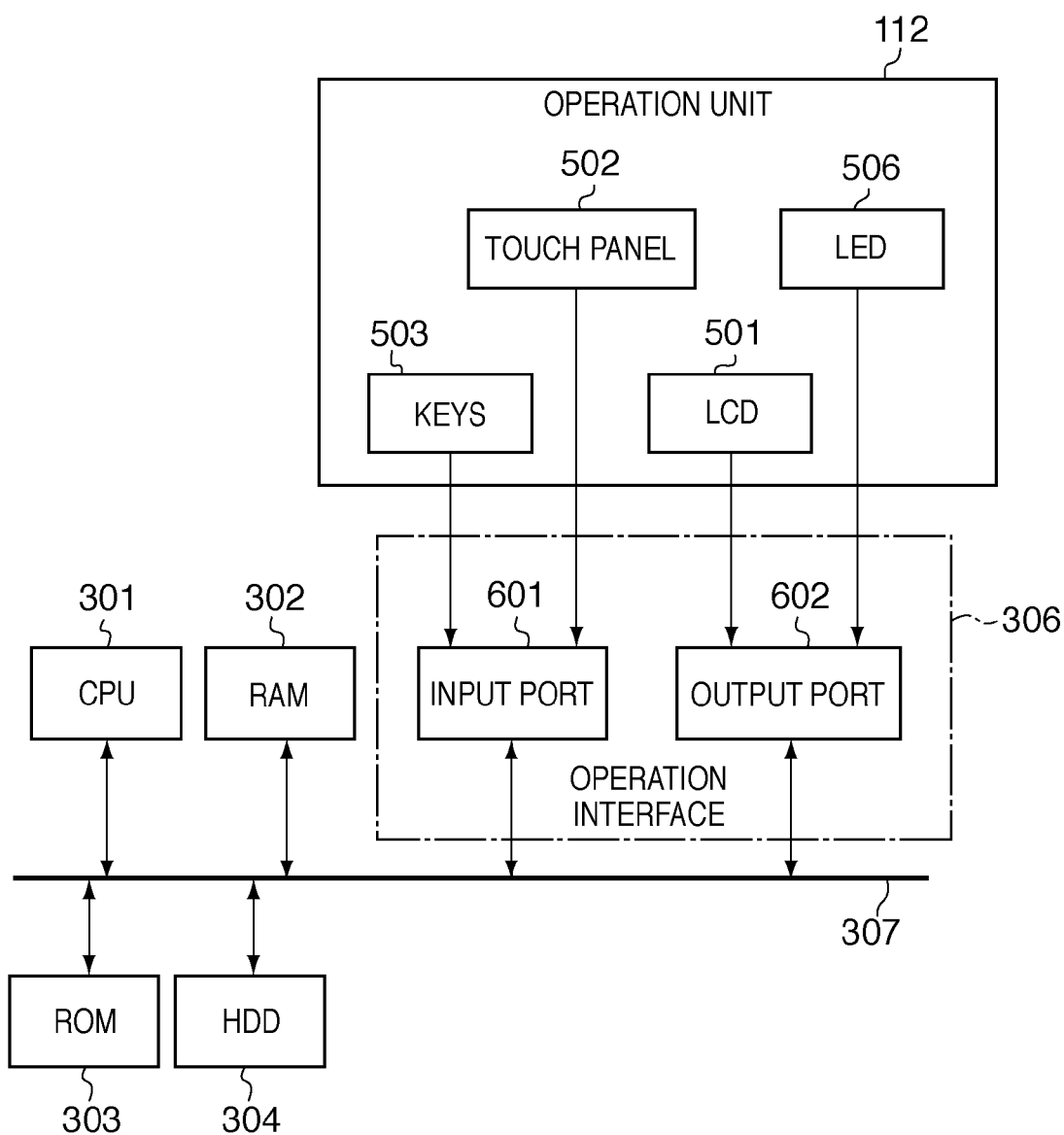
FIG. 4 is a block diagram that shows an example configuration of an operation unit 112 of the image forming apparatus 110 according to the present invention.

Next is a description of the configuration of the operation unit 112, with reference to FIG. 4. FIG. 4 is a block diagram that shows an example configuration of the operation unit 112 of the image forming apparatus 110 according to the present invention. The operation unit 112 is connected to the system bus 307 via the operation unit interface 306. As described above, the CPU 301, the RAM 302, the ROM 303, the HDD 304, and so forth are connected to the system bus 307. As shown in FIG. 4, the operation unit 112 includes an LCD display unit 501 that outputs display screens, a touch panel 502, keys 503 including various hard keys, and an LED display unit 506.

The operation unit interface 306 has an input port 601 for controlling input from a user, and an output port 602 for controlling a screen output device. The input port 601 transfers user input from the touch panel 502 and the keys 503 to the CPU 301. The CPU 301 generates display screen data based on the content of the user input and a control program, and outputs display screens to the LCD display unit 501 via the output port 602. Also, the CPU 301 controls the LED display unit 506 as necessary via the output port 602.

HTTP Protocol

Figure 5:
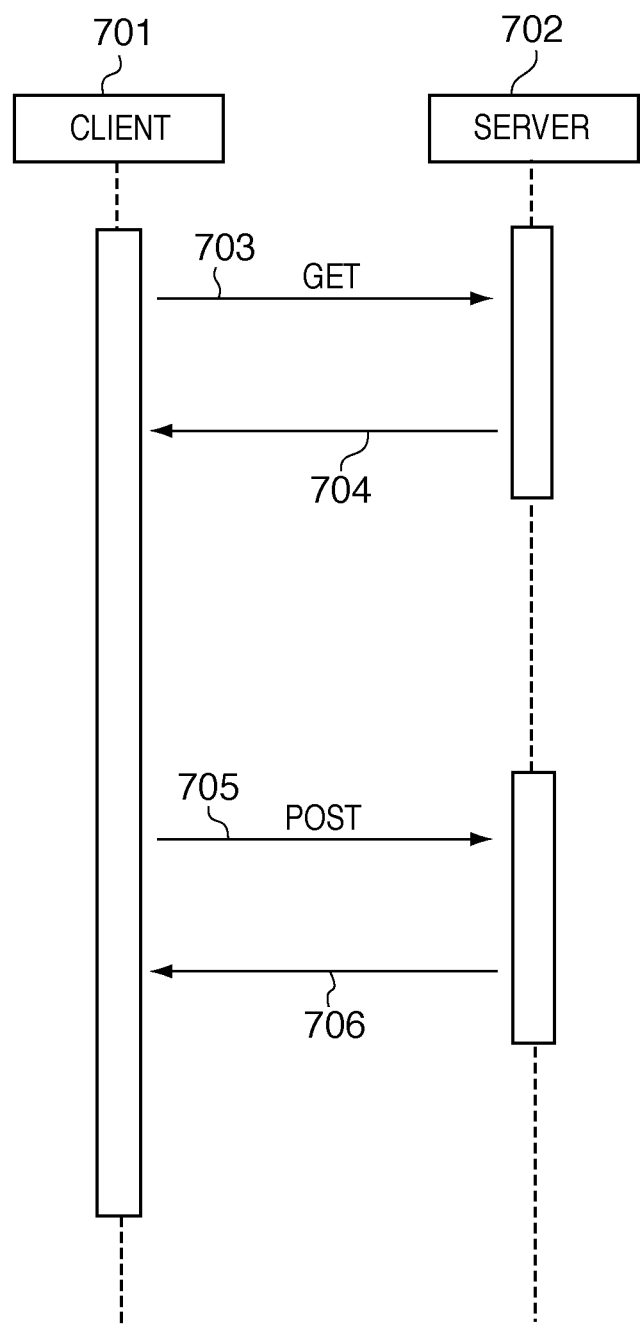
FIG. 5 is a sequence diagram that shows a flow of request processing and response processing according to an HTTP protocol.

Next is a description of request and a response flow according to an HTTP protocol, with reference to FIG. 5. FIG. 5 is a sequence diagram that shows the flow of request processing and response processing according to the HTTP protocol. Here, a client 701 is software that transmits an HTTP request and receives an HTTP response. For example, the client 701 corresponds to the web browser of the image forming apparatus 110, or an ordinary web browser that operates in the host computer 120. A server 702 is software that receives the HTTP request and performs corresponding processing, and transmits back the HTTP response. For example, the server 702 corresponds to the information processing apparatus 130 or the web server module 202 of the image forming apparatus 110.

The client 701 transmits the HTTP request by either a GET method or a POST method. Here, when the client 701 transmits an HTTP request 703 for a desired resource to the server 702 by a GET method, the resource is ordinarily designated according to URI format (specifically, URL format). The server 702 acquires or generates data corresponding to the resource designated by the HTTP request 703, and transmits back that data in an HTTP response 704. Pull-type printing is an example of a printing method employing this sort of GET method.

Next is a description of transmission of an HTTP request by a POST method. When a form is included in an HTML document, and a POST method is designated as the transmission method for the document, the following sort of processing is performed. First, information that has been input by a user via a form displayed by a web browser of the client 701 is encoded. The encoded information, that is, the input content of the form, is transmitted to the server 702 by a POST method as an attachment to an HTTP request 705. In the server 702, the designated resource receives and processes the data sent from the client 701, generates an HTTP response 706, and transmits the HTTP response 706 back to the client 701. Push-type printing is an example of a printing method employing this sort of POST method.

Browser Screen

Figure 6:
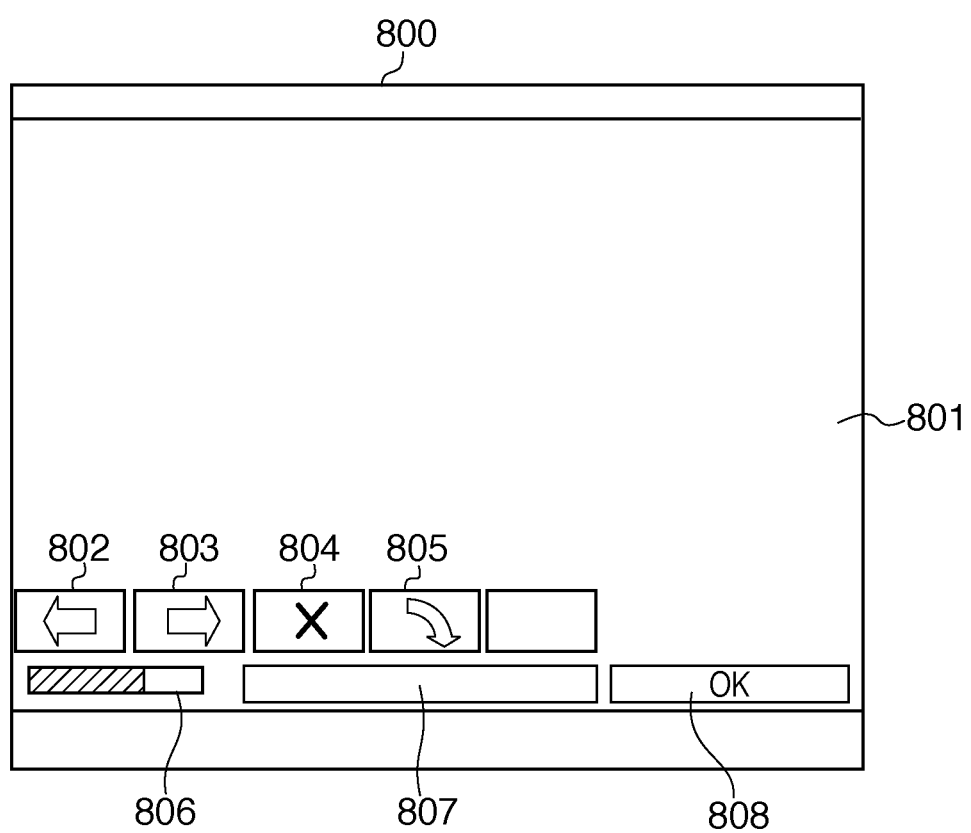
FIG. 6 shows an example of a browser screen 800 according to the present invention.

Next is a description of the configuration of a web browser screen displayed by the UI module 201 of the image forming apparatus 110, with reference to FIG. 6. FIG. 6 shows an example of a browser screen 800 according to the present invention. The display in the browser screen 800 includes a URL input field 807, an OK button 808, a progress bar 806, a content display area 801, a back button 802, a forward button 803, a reload button 805, and a stop button 804.

The URL input field 807 is a field where a user inputs a URL of a desired resource, and when the user presses this field, a virtual full keyboard for performing character input is displayed. The user can input a desired character string using soft keys depicting key tops arranged on the virtual full keyboard. The OK button 808 is a soft key that confirms the URL character string that was input. When the URL is confirmed, the web browser module 204 issues an HTTP request for acquiring the resource. The progress bar 806 indicates the progress status of content acquisition processing according to the response to the HTTP request. The content display area 801 is an area where an acquired resource is displayed. The back button 802 is a soft key for going backward in the history of the display content and re-displaying content that was displayed prior to the content presently being displayed. The forward button 803 is a soft key for, when display is being performed by going backward in the history of the display content, displaying content that was displayed in the previous instance after the content presently being displayed. The reload button 805 again acquires and displays the content that is presently being displayed. The stop button 804 is a soft key that stops content acquisition processing that is presently being executed. The browser screen may also include a status area where messages from various functions of the image forming apparatus 110 are displayed. In this status area, it is possible to display messages prompting the attention of the user from the scanner, the printer, other functions, and so forth even while displaying the browser screen 800. It is likewise possible to display messages from the web browser. The web browser function displays a character string of a link location URL, a character string of a content title, a message designated by a script, and so forth.

Pull-Type Print Screen

Figure 8:
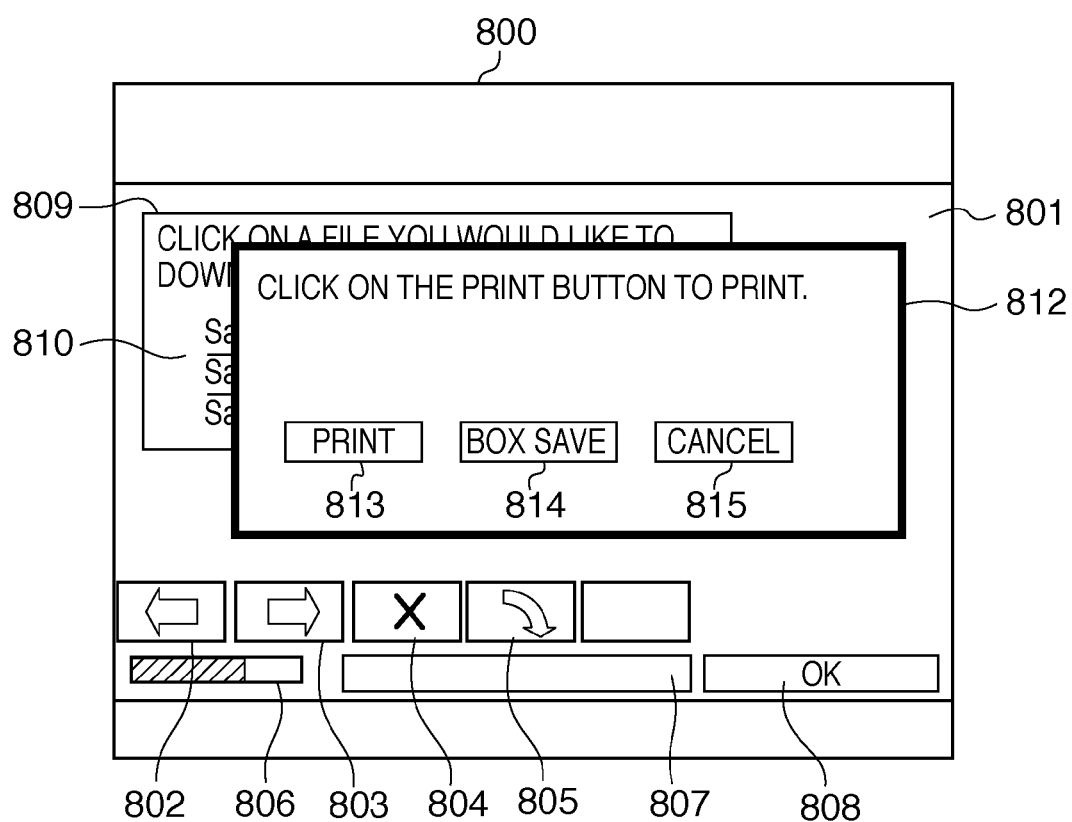
FIG. 8 shows an example of a print screen displayed when pull-type printing is selected according to the present invention.

Next is a description of a print screen displayed when pull-type printing is selected, with reference to FIGS. 7, 8, and 10. FIGS. 7 and 8 show an example of the print screen displayed when pull-type printing is selected according to the present invention. As shown in FIG. 7, when pull-type printing is selected, a document data selection area 809 is displayed in a content display area 801 of the browser screen

800. HTML data displayed in the document data selection area 809 is shown in FIG. 10. Here, pull-type printing (a second method) indicates a printing method in which image data to be printed is transmitted from an information processing apparatus to an image forming apparatus, and image processing prior to printing is executed in the image forming apparatus. Image processing prior to printing refers to processing such as PDL conversion performed on image data, and processing in which image data is converted to print data in a print format.

In pull-type printing, document data is downloaded from the information processing apparatus 130, and a print instruction is performed in the image forming apparatus 110, so the HTML configuration is such that the user is caused to perform a GET request for the document data. Also, in pull-type printing, because the document data is downloaded using a GET request, the document data is displayed as a hyperlink 810. When the user presses the hyperlink 810, downloading of the document data is started. When downloading is completed, a print dialogue 812 is displayed in the content display area 801, as shown in FIG. 8. A print instruction button 813, a BOX save button 814 that saves the downloaded document in the data management unit 133 of the image forming apparatus 110, and a cancel button 815 for cancelling printing are displayed in the print dialogue 812.

Push-Type Print Screen

Figure 9:
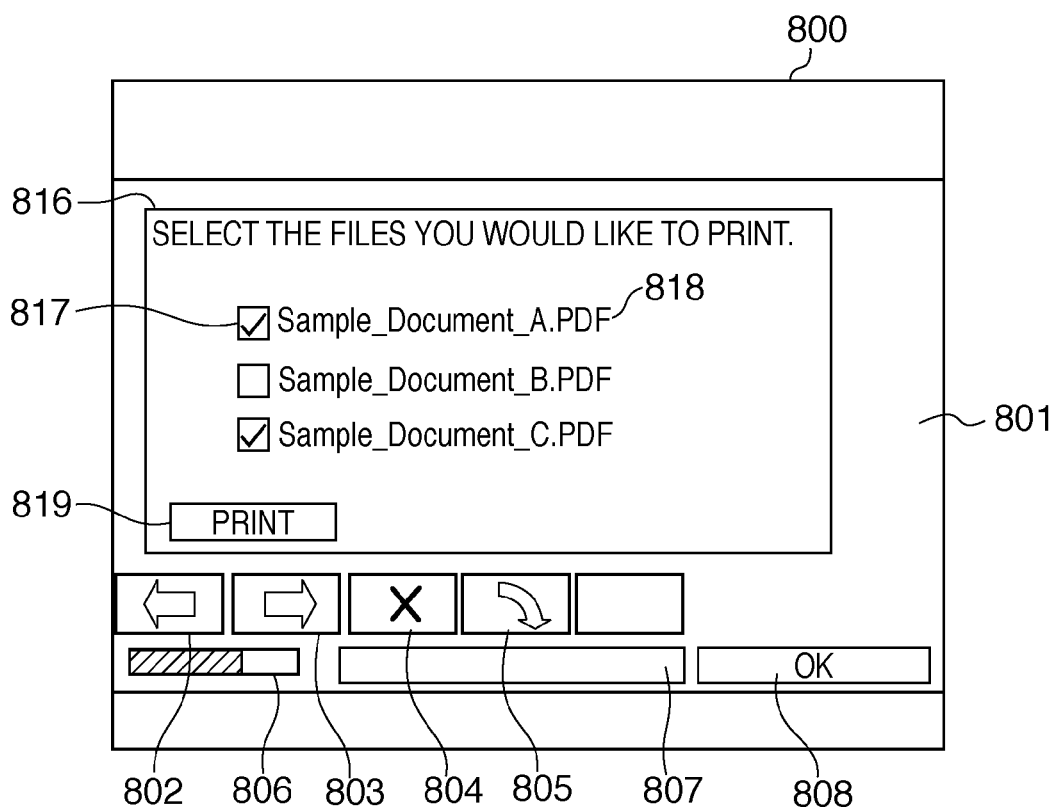
FIG. 9 shows an example of a print screen displayed when push-type printing is selected according to the present invention.

Next is a description of a print screen displayed when push-type printing is selected, with reference to FIGS. 9 and 11. FIG. 9 shows an example of the print screen displayed when push-type printing is selected according to the present invention. An IPP, an LPR, web services, and the like are examples of the method for making a remote request in push-type printing, but in the following description a web service is used for the remote request. Note that the same sort of processing can be performed also in the case of an IPP or an LPR.

As shown in FIG. 9, when push-type printing is selected, a document data selection area 816 is displayed in the content display area 801 of the browser screen 800. A check box 817, document data 818, and a print instruction button 819 are displayed in the document data selection area 816. HTML data displayed in the document data selection area 816 is shown in FIG. 11. Here, push-type printing (a first method) indicates a printing method in which image processing prior to printing is executed on image data in an information processing apparatus, and that image data (print data) is transmitted to an image processing apparatus.

In push-type printing, a user selects document data to be printed from within the check box 817 of the document data selection area 816 displayed by the web browser of the image forming apparatus 110. Next, when the user presses the print instruction button 819, the web browser performs a POST request to the web server unit 131 of the information processing apparatus 130. Furthermore, processing is executed according to the content of the POST request by a business logic unit 903 (described later) of the information processing apparatus 130. Next, a remote request is performed from the business logic unit 903 to the web service provider module 203 of the image forming apparatus 110 via a web service request unit 901, described later. In response to the remote request from the information processing apparatus 130, the web service provider module 203 executes printing by the printer 114 via the job manager module 209 and the print manager module 212.

Detailed Configuration of Information Processing Apparatus 130

Figure 12:
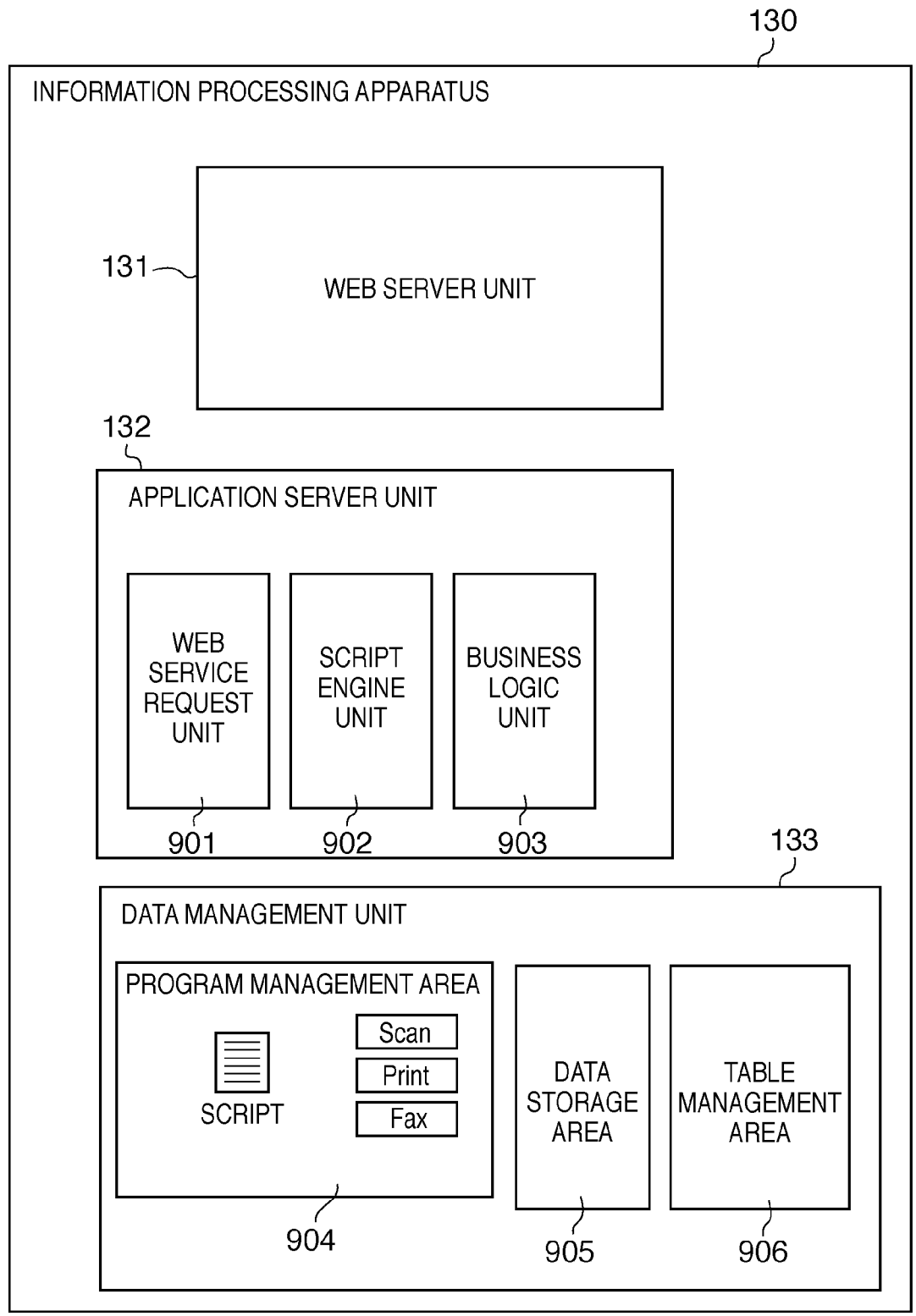
FIG. 12 is a block diagram that shows a detailed configuration of an information processing apparatus 130 according to the present invention.

Next is a description of the detailed configuration of the information processing apparatus 130, with reference to FIG. 12. FIG. 12 is a block diagram that shows the detailed configuration of the information processing apparatus 130 according to the present invention. As shown in FIG. 12, the application server unit 132 includes the web service request unit 901, a script engine unit 902, and the business logic unit 903. The data management unit 133 includes a program management area 904, a data storage area 905, and a table management area 906.

The business logic unit 903 is called from the web server unit 131 and executes processing in response to an HTTP request. As a result of processing, the business logic unit 903 returns dynamically generated HTML to the web server unit 131. The script engine unit 902 is called from the business logic unit 903, and reads a script (program execution description) from the program management area 904 described below and returns the script to the business logic unit 903. Afterward, the business logic unit 903 sequentially executes the script read by the script engine unit 902. The web service request unit 901 is called from the business logic unit 903, and for example, issues a call for a web service to the external web service provider module 203.

The program management area 904 manages various scripts and programs called from scripts. Data in the program management area 904 can be added to or changed by a plug-in mechanism. With this plug-in mechanism, it is possible to customize functions of the information processing apparatus 130. The data storage area 905 is an area where data of documents and the like is stored. The table management area 906 is an area where a table is stored in which information associating a printing method (pull-type printing or push-type printing) with the image forming apparatus 110 has been saved.

Table in Table Management Area

Next is a description of a table 907 saved in the table management area 906 of the data management unit 133 in the information processing apparatus 130, with reference to FIG. 13. FIG. 13 shows an example of the table 907 that has been stored in the table management area 906 according to the present invention. The table 907 is a data table for relating a printing method with an IP address of each image forming apparatus, the IP address serving as identification information. The information processing apparatus 130 refers to the table 907 of the table management area 906 to select which printing method to provide to an image forming apparatus that has been accessed. The table 907 may also be updated by the business logic unit 903 via the table management area 906.

First Embodiment

Next is a description of a first embodiment according to the present invention, with reference to FIGS. 14A and 14B. FIGS. 14A and 14B are a flowchart that shows a processing procedure of print processing according to the first embodiment. In the below description, the numbers following S indicate step numbers of the respective processing. Also, the processing described below is executed by the image forming apparatus 110 and the information processing apparatus 130. Specifically, processing performed by the image forming apparatus 110 is shown on the left side of the dotted line in FIGS. 14A and 14B, and processing performed by the information processing apparatus 130 is shown on the right side of the dotted line.

In S1001, the CPU 301 selects the web browser based on information input by a user via the operation unit 112. Further, in S1002, the CPU 301 inputs a print screen URL based on the information input by the user via the operation unit 112. Next, in S1003, the web browser module 204 transmits a print screen GET request to the web server unit 131 of the information processing apparatus 130 via the HTTP module 205. Here, the web browser module 204 attaches an IP address, serving as identification information, of the image forming apparatus 110 to a header (request information) of the transmitted GET request.

Next, in S1004, the web server unit 131 receives the print screen GET request from the web browser module 204. In S1005, the application server unit 132 analyzes the header of the GET request from the web browser module 204, and acquires the IP address of the image forming apparatus 110. Once the IP address is acquired, in S1006, the application server unit 132 refers in the data management unit 133 to the table 907, in which the IP address of the image forming apparatus 110 is associated with a printing method, to select the printing method to be provided for the image forming apparatus 110. Then, in S1007, the application server unit 132 determines whether or not the printing method selected in S1006 is push-type printing. When the selected printing method is not push-type printing, that is, when the selected printing method is pull-type printing, processing advances to S1008, and when the selected printing method is push-type printing, processing advances to S1017.

When pull-type printing has been selected, in S1008, the application server unit 132 generates HTML data for the pull-type document data selection area 809. Further, in S1009, the web server unit 131 transmits the HTML data of the browser screen 800 including the document data selection area 809 to the image forming apparatus 110 as a GET response. On the other hand, in S1010, based on the received HTML data, the CPU 301 displays the browser screen 800 including the document data selection area 809 in the LCD display unit 501. Next, in S1011, the CPU 301 transmits the document data GET request to the web server unit 131 via the HTTP module 205, according to the user's selection of document data by pressing the hyperlink 810.

Once the document data GET request is received, in S1012, the application server unit 132 reads that document data from the data storage area 905, and transmits a GET response to the image forming apparatus 110 via the web server unit 131. In S1013, the CPU 301 receives the document data transmitted in the response from the web server unit 131, and temporarily saves the received document data in the RAM 302. Further, the CPU 301 displays the browser screen 800 including the print dialogue 812 in the LCD display unit 501. Next, in S1014, the CPU 301 performs PDL conversion of the document data, thus converting the document data to print data. Here, print data refers to data on which image processing prior to printing has been executed. For example, this is data that has been converted to bitmap data by the RIP 311, and thus is in a format printable by the printer 114. Also, when the user presses the print instruction button 813 of the print dialogue 812, in S1015, the CPU 301 instructs the printer 114 to print. Here, the CPU 301 not only gives a print instruction, but also saves the document data to the HDD 304. Then, in S1016, the printer 114 executes printing according to the print data. When printing is completed, the printer 114 informs the CPU 301 that printing is completed.

When a determination is made that push-type printing has been selected in S1007, in S1017, the application server unit 132 generates the push-type document data selection area 816. Further, in S1018, the web server unit 131 transmits the browser screen 800 including the document data selection area 816 to the image forming apparatus 110 as a GET response. On the other hand, in S1019, the CPU 301 displays the browser screen 800 including the received document data selection area 816 in the LCD display unit 501. Next, in S1020, the CPU 301 selects at least one item of document data based on information input by the user via the check box 817, and detects pressing of the print instruction button 819 by the user. Here, the user can select a plurality of check boxes 817. When the print instruction button 819 is pressed, in S1021, the CPU 301 transmits a POST request to the web server unit 131 based on the selected document data and the print instruction content (print information).

When the POST request is received, in S1022, the application server unit 132 reads at least one item of document data that has been selected by the user from the data management unit 133, and executes PDL conversion by the business logic unit 903. Next, in S1023, the application server unit 132 instructs the web service provider module 203 of the image forming apparatus 110 to print the print data by an LPR, a web service, an IPP, or the like via the web service request unit 901. When the print instruction is received, in S1016, the CPU 301 performs printing by the printer 114 via the job manager module 209 and the print manager module 212 according to the requested print instruction, by the web service provider module 203.

As described above, in the information processing apparatus according to the present embodiment, when a request from a web browser of an image forming apparatus has been received, the information processing apparatus selects push-type printing in which image data is transmitted to the web browser as a response to the request from the web browser, or pull-type printing in which image data is transmitted as a new request without employing the web browser. The information processing apparatus generates a print screen based on the selected printing method, and transmits the print screen to the image forming apparatus. Also, the information processing apparatus, based on information that has been input via the transmitted print screen, in the case of push-type printing, transmits print data on which image processing prior to printing has been executed, and in the case of pull-type printing, transmits image data in its present format without image processing prior to printing being performed on the image data. Thus, with this information processing apparatus, by selecting an appropriate printing method for each image forming apparatus, it is possible to effectively allow the image forming apparatus to have the advantages of the respective printing methods. For example, in this information processing apparatus, push-type printing is selected for an image forming apparatus that is capable of push-type printing, and pull-type printing is selected for an image forming apparatus that is not capable of push-type printing. Thus, print processing that is cooperatively executed by an image forming apparatus and the information processing apparatus can be realized with all of the image forming apparatus. Also, in the case of push-type printing, image processing prior to printing is executed by the information processing apparatus. Accordingly, in the case of push-type printing, it is acceptable to only customize the print logic of the information processing apparatus, and not customize the print logic of individual image forming apparatus, so the degree of customizability can be improved.

The present invention is not limited to the above embodiment; various modifications are possible. For example, in this information processing apparatus, a table in which IP addresses serving as identification information are associated with printing methods may be stored in advance in a memory or the like. In this case, in the information processing apparatus, a printing method may be selected by referring to the printing method in the table corresponding to the acquired IP address. By thus providing the table, it is possible to easily execute printing method selection.

Second Embodiment

Figure 15:
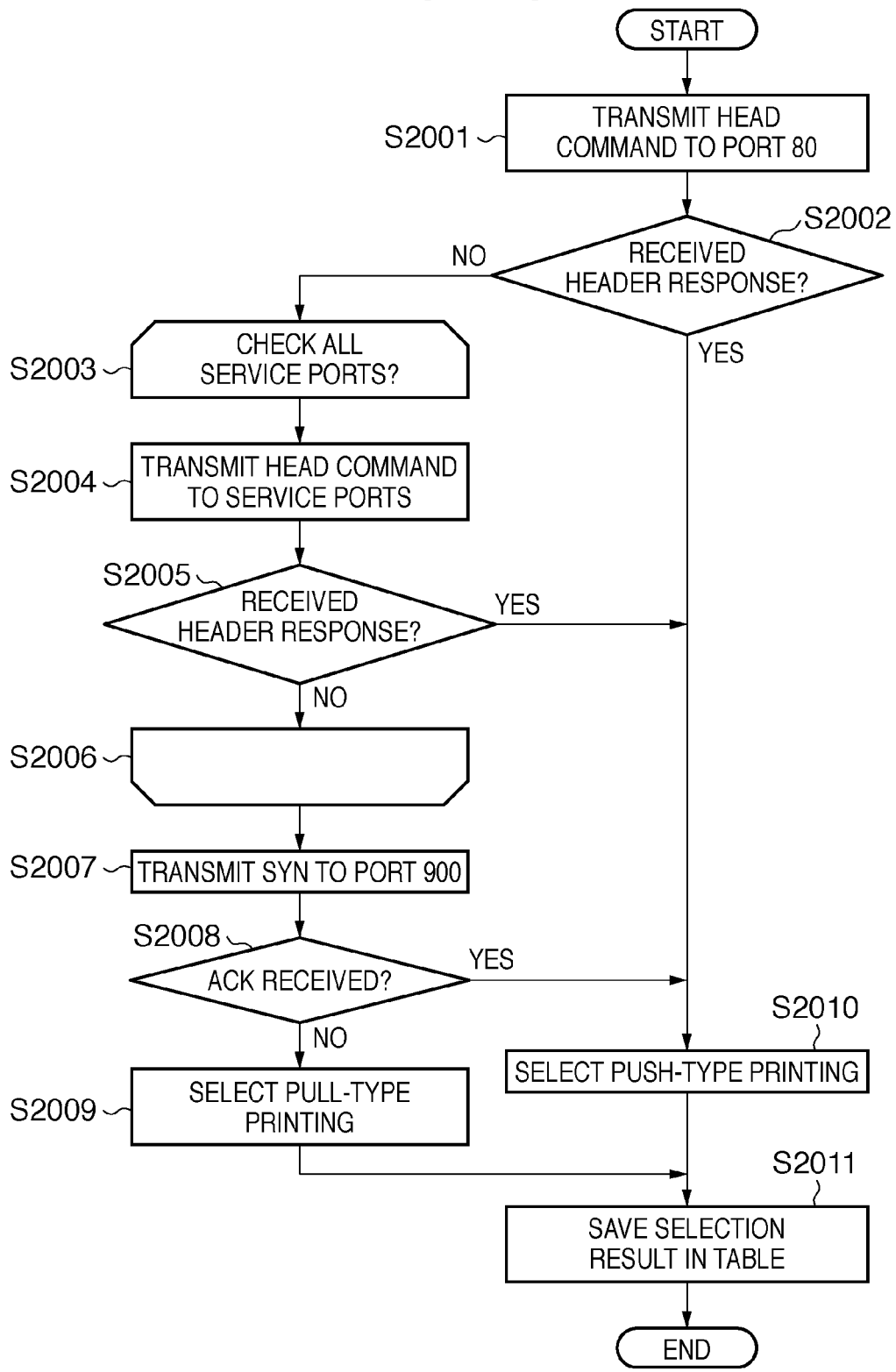
FIG. 15 is a flowchart that shows a processing procedure of print processing according to a second embodiment.

Next is a description of a second embodiment according to the present invention, with reference to FIG. 15. In the second embodiment, the configuration of the information processing system 10 and the configuration of each apparatus included in the information processing system 10 are the same as in the first embodiment, so a description thereof is omitted here. FIG. 15 is a flowchart that shows a processing procedure of print processing according to the second embodiment. In the below description, the numbers following S indicate step numbers of the respective processing. Also, the processing described below is executed by the information processing apparatus 130.

In the first embodiment, a description is given of processing when information in which the IP address of each of the image forming apparatus included in the information processing system 10 is associated with a printing method has been saved in the table 907 of the information processing apparatus 130. However, in the second embodiment, it is assumed that of the information in which the IP address of each of the connected image forming apparatus included in the information processing system 10 is associated with a printing method, only part of that information has been saved in the table 907.

Accordingly, in the information processing apparatus 130 according to the second embodiment, with respect to an IP address that has not been defined in the table 907, that image forming apparatus IP address is automatically associated with a printing method. Also, it is assumed that the basis for selecting a printing method depends on the network environment of the image forming apparatus, or the advantages the image forming apparatus is desired to have. Also, in the second embodiment a determination is made of whether or not push-type printing is possible, in order to avoid the problem that with pull-type printing, the image forming apparatus can only print document data that the PDL manager module of the image forming apparatus can process. When push-type printing is possible in the image forming apparatus, push-type printing is always executed, and when push-type printing is not possible, pull-type printing is executed.

The determination of whether or not push-type printing is possible is only performed when there is a first print screen request from an image forming apparatus. Furthermore, the information processing apparatus 130, according to the results of that determination, updates the association information of image forming apparatus IP addresses and printing methods (selection information) in the table 907, and from the next time the table 907 is referred to when making the determination. Push-type printing is possible when the print instruction from the information processing apparatus 130 is not blocked by a firewall, a proxy, or the like and therefore can arrive at the image forming apparatus. For example, a method employing an IPP, a method employing a web service, and a method employing an LPR are conceivable as methods for instructing push-type printing from the information processing apparatus 130 to an image forming apparatus. The processing described below is performed instead of the processing in S1006 in the flowchart in FIGS. 14A and 14B. Therefore, in the second embodiment, the processing of S1001 to S1005 and S1007 to S1023 is the same as in the first embodiment, so a description thereof is omitted here.

In S2001, the web server unit 131 transmits a HEAD command by the business logic unit 903 to the web server module 202 of the image forming apparatus 110 in order to determine whether or not a print instruction by IPP is possible. Here, among a plurality of existing ports for transmitting HEAD commands to the web server module 202, the HEAD command is transmitted using a port 80. Afterward, in S2002, the application server unit 132 determines whether or not a HEAD response has been received from the web server module 202. Here, when a HEAD response has been received the processing advances to S2010, and when a HEAD response has not been received the processing advances to S2003.

In S2010, the application server unit 132 selects push-type printing as the printing method. Then, in S2011, the application server unit 132 associates the IP address of the image forming apparatus 110 with the printing method, and saves this information in the table 907 stored in the table management area 906 via the application server unit 132.

On the other hand, in S2003 to S2006, the application server unit 132, using the business logic unit 903, sequentially transmits HEAD commands to all of the above plurality of ports, and determines whether or not a HEAD response has been received. Here, when a HEAD command has been received as a result of transmitting a HEAD command to any port, processing advances to S2010, push-type printing is selected, and then in S2011 the table 907 is updated. On the other hand, when a HEAD response has not been received at any port, processing advances to S2007.

In S2007, the web server unit 131 transmits a SYN by the business logic unit 903 to a port 9100, which is an LPR port of the web server module 202, in order to determine whether or not a print instruction by LPR is possible. Then, in S2008, the application server unit 132 determines whether or not an ACK response has been received for the transmitted SYN. If an ACK response has been received, processing advances to S2010, push-type printing is selected, and then in S2011 the table 907 is updated. On the other hand, if an ACK response has not been received, processing advances to S2009.

In S2009, the application server unit 132 selects pull-type printing as the printing method of the image forming apparatus 110. Then, processing advances to S2011 and the table 907 is updated. However, if the selection result is already saved in the table 907, the selection result is not saved again.

As described above, in the information processing apparatus according to the second embodiment, when selecting a printing method, a determination is made of whether or not printing is possible by any among printing by IPP, printing by web service, and printing by LPR, and push-type printing is selected if possible. On the other hand, the information processing apparatus selects pull-type printing if none of those printing methods is possible. Thus, it is possible to select a printing method appropriate for that image forming apparatus even when information of a printing method for that image forming apparatus has not been defined in the table 907. Also, in the information processing apparatus, by updating the result of the determination in the table 907, from the next time it is possible to easily select a printing method without making a determination for that image forming apparatus.

Third Embodiment

Figure 16:
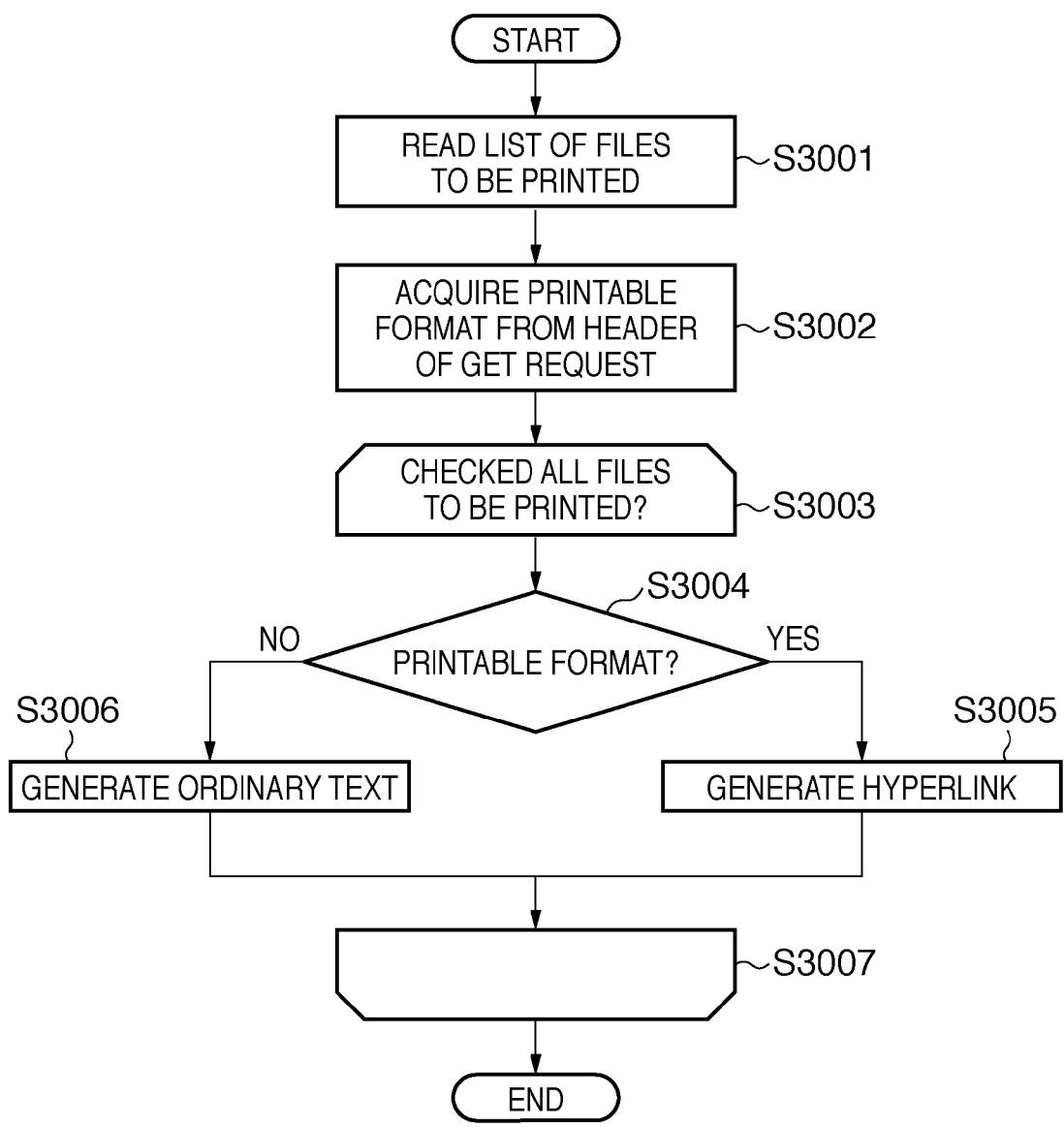
FIG. 16 is a flowchart that shows a processing procedure of print processing according to a third embodiment.

Next is a description of a third embodiment, with reference to FIG. 16. In the third embodiment, the configuration of the information processing system 10 and the configuration of each apparatus included in the information processing system 10 are the same as in the first embodiment, so a description thereof is omitted here. FIG. 16 is a flowchart that shows a processing procedure of print processing according to the third embodiment. In the below description, the numbers following S indicate step numbers of the respective processing. Also, the processing described below is executed by the information processing apparatus 130. The processing described below is performed instead of the processing in S1008 in the flowchart in FIGS. 14A and 14B. Therefore, in the third embodiment, the processing of S1001 to S1007 and S1009 to S1023 is the same as in the first embodiment, so a description thereof is omitted here.

In S1008, the print screen when pull-type printing is selected is generated. In this print screen, document data that has been saved in the data management unit 133 is displayed as document data that can be downloaded. However, in the image forming apparatus 110, only document data in a format that can be processed by the PDL manager module 213 (for example, a format for which PDL conversion is possible) can be printed. Consequently, in the third embodiment, only document data in a format for which PDL conversion by the PDL manager module 213 of the image forming apparatus 110 is possible is displayed as a downloadable hyperlink. Accordingly, in the third embodiment, in S1003 in the flowchart in FIGS. 14A and 14B, the image forming apparatus 110 transmits the GET request after embedding format information of document data that can be converted by the RIP 311 of the image forming apparatus 110 in the GET request header.

In S3001, the application server unit 132 reads all of the document data to be printed from the data management unit 133. Then, in S3002, the application server unit 132 analyzes the header of the GET request from the HTTP module 205 of the image forming apparatus 110 to the web server unit 131. Further, the application server unit 132 reads the format of document data that can be converted by the codec manager module 210 of the image forming apparatus 110.

Next, in S3003 to S3007, the application server unit 132, with respect to all of the document data to be printed, determines whether or not to display a hyperlink (perform a selectable display), and generates HTML code. Specifically, in S3004, the application server unit 132 determines whether or not document data to be printed is in a format for which PDL conversion by the PDL manager module 213 of the image forming apparatus 110 is possible. Here, when the document data to be printed is in a PDL-convertible format, processing proceeds to S3005, and the application server unit 132 generates a hyperlink to that document data. On the other hand, when the document data to be printed is not in a PDL-convertible format, processing proceeds to S3006, and the application server unit 132 generates ordinary text. These processing steps are performed with respect to all documents to be printed.

As described above, in an image forming apparatus according to the third embodiment, information about a format that can be processed by this apparatus may be added to print screen request information. Thus, when pull-type printing has been selected, according to the format information, the information processing apparatus can generate a print screen that selectably displays only image data that can be processed by that image forming apparatus. Thus, it is possible to easily select only image data that can be printed by the image forming apparatus being operated by the user, and so it is possible to provide a user-friendly operating system.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-182892 filed on Aug. 5, 2009, which is hereby incorporated by reference herein in its entirety.

The invention claimed is:

1. An information processing apparatus that is capable of communicating with an image forming apparatus having a web browser, the information processing apparatus comprising:
a selection unit configured to select a first method or a second method based on identification information of the image forming apparatus, wherein image data is transmitted to the web browser as a response to a request from the web browser in the first method, and the image data is transmitted as a new request without employing the web browser in the second method; and
a transmission unit configured to transmit the image data to the image forming apparatus according to the selection by the selection unit.

2. The information processing apparatus according to claim 1, further comprising:
a generation unit configured to generate an operation screen according to the selection by the selection unit; and
a response unit configured to transmit the generated operation screen to the web browser.

3. The information processing apparatus according to claim 1, further comprising:
a storage unit configured to store a database in which identification information of each image forming apparatus is associated with the first method or the second method;
wherein the selection unit uses the identification information included in the request and the database to select the first method or the second method.

4. The information processing apparatus according to claim 3, wherein the identification information of the image forming apparatus is an IP address of the image forming apparatus.

5. The information processing apparatus according to claim 1, wherein the image data is transmitted to the web browser as a response to a POST request from the web browser in the first method.

6. The information processing apparatus according to claim 1, wherein the image data is transmitted to the web browser as a web service request in the second method.

7. A method for controlling an information processing apparatus that is capable of communicating with an image forming apparatus having a web browser, the method comprising:
selecting a first method or a second method based on identification information of the image forming apparatus, wherein image data is transmitted to the web browser as a response to the request from the web browser in the first method, and the image data is transmitted as a new request without employing the web browser in the second method; and
transmitting the image data to the image forming apparatus according to the selected method.

8. A non-transitory computer-readable storage medium storing a computer program that causes a computer to execute the method for controlling an information processing apparatus according to claim 7.

9. The method according to claim 7, further comprising:
generating an operation screen according to the selection; and
transmitting the generated operation screen to the web browser.

10. The method according to claim 7, further comprising:
storing a database in which identification information of each image forming apparatus is associated with the first method or the second method;
wherein, in the selection, the identification information included in the request and the database are used to select the first method or the second method.

11. The method according to claim 10, wherein the identification information of the image forming apparatus is an IP address of the image forming apparatus.

12. The method according to claim 7, wherein the image data is transmitted to the web browser as a response to a POST request from the web browser in the first method.

13. The method according to claim 7, wherein the image data is transmitted to the web browser as a web service request in the second method.

* * * * *